Patented Sept. 3, 1940

2,213,615

UNITED STATES PATENT OFFICE 2,213,615

GAS PURIFYING MATERIAL FREE FROM HYDROGEN SULPHIDE GENERATING ORGANISMS

Gilbert E. Seil, Cynwyd, Pa., assignor to E. J. Lavino and Company, Philadelphia, Pa., a corporation of Delaware No Drawing. Application February 27, 1939, Serial No. 258,853

1 Claim. (Cl. 252—191)

This invention relates to gas purifying materials such as unmixed powdered gas purifying materials, and gas purifying materials mixed with wood shavings. In the latter class of materials the wood shavings act as a fluffing or distributing agent for the powdered material. In the nomenclature of the art, gas purifying materials of the first class are called "unmixed oxides" or simply "oxides," and gas purifying materials of the second class are called "mixed oxides" or "sponges." The terms "clean gas" and "foul gas" are used herein in conformity with their usual meanings in this field, namely; "clean gas" is gas containing no hydrogen sulphide, while gas containing hydrogen sulphide is called "foul gas." The term "traces" indicates the definite presence of $H_2S$ but in amounts less than 5 grains per 100 cubic feet of gas, and it must be borne in mind that gas companies are not permitted to distribute gas containing traces of $H_2S$ to the consumers, and for this reason the gas going from the purification system to the holders must be clean. Gas purifying materials which have been subjected to sulphiding are known as "fouled oxides" or "fouled sponges." "Revivification" is the process of re-actifying a fouled ferric oxide material by contact with oxygen, and materials reactified in this fashion are known as revivified materials.

One method of removing hydrogen sulphide from a gaseous mixture is to pass the mixture through a series of purifiers known as dry boxes. The dry boxes usually contain a ferric oxide sponge, and the $H_2S$ is removed by causing it to react with the ferric oxide, forming ferric sulphide and water. In following this method it is the general practice to pass the gas containing the $H_2S$ through a series of three or four boxes. The first box removes most of the $H_2S$, say 90% to 95%, the second box (or the second and third boxes) removes the balance, and the final box is a safety measure to insure the complete absence of $H_2S$ in the gas going to the holders for distribution. For example, the following results are typical in a four box system, the $H_2S$ being expressed in grains per 100 cubic feet of gas:

| | $H_2S$ at inlet | $H_2S$ at outlet |
|---|---|---|
| Box 1 | 360 | 30. |
| Box 2 | 30 | Trace. |
| Box 3 | Trace | Clean. |
| Box 4 | Clean | Do. |

When the accumulated sulphur in Box No. 1 reaches the point at which it is no longer economical to continue this box in service, the box is taken from the series, and the fouled material is removed from the box and revivified or it may be revivified in place. Box No. 2 then becomes the first box of the series, and a box containing new or revivified ferric oxide material is inserted as the last box in the series.

The fouled gas purifying material is revivified by bringing it into contact with air either in the box or after removal from the box. In contact with oxygen the ferric sulphide is oxidized to ferric oxide and elemental sulphur, and the revivified material may be replaced in the system for further fouling. When the sulphur in the material is built up to a point at which it is no longer economical to revivify and reuse the material, it is discarded.

Individual plants may vary considerably from the procedure outlined above, but for the purposes of this description it is sufficient to say that it is general practice to arrange the purification series so that the final box contains purifying material substantially free of ferric sulphide, so that by passing the gas through this box the last traces of $H_2S$ are removed.

Various gas plants have found that at times the passage of clean gas through a box containing purifying material which has not previously been subjected to sulphiding will cause the gas to pick-up small amounts of hydrogen sulphide. Gas plants are not permitted to distribute gas containing $H_2S$, and the presence of even the slightest trace of $H_2S$ in the gas leaving the final box of the purification system gives rise to a serious problem.

Examination of the purification materials in boxes which exhibit the tendency to foul the clean gas when the purification material is substantially free of ferric sulphide and sulphur revealed the presence of molds or fungi which live and grow in the atmosphere of the box, and which are capable of generating hydrogen sulphide. The hydrogen sulphide thus generated is picked-up by and contaminates the gas in its passage through the box.

Several of the molds which have caused fouling of the gas in different gas plants have been definitely identified. Among others, I can list the Fungi Imperfecti Trichoderma of the order Moniliales, the Fungi Imperfecti Repens and Macrosporum of the order Rhinotrichum; several species of the Fungi Graphium, and the Phycomycete Mucor of the order Mucorales. Trichoderma is a common soil mold with marked cellulose decomposing tendencies. Mucor is a very common saprophyte. Both Repens and Macrosporum have been observed growing on decaying soft woods. Probably many other organisms have similar characteristics to those mentioned. Troublesome fungi or the spores thereof apparently are carried by the wood shavings as hosts or the wood fluffing agent is inoculated with them. But under the dry box operating conditions, they seem to come out of spore form and assume active growth and fruition. Therefore, it is the teaching of this invention that this activation of fungi spores should be avoided by the impregnation of the dry box material with a fungicide.

Ferric oxide purifying material is generally used in the form of sponge, that is spread upon or mixed with wood shavings before it is installed in the purification system. The wood shavings act as a fluffing medium, and provide a method of exposing the maximum surface of the ferric oxide for reaction and at the same time reducing the pressure needed to force the gas through the box. In view of the characteristics of the organisms mentioned, it is probable that they are introduced into the sponge with the wood shavings.

It is a major object of my invention to eliminate the above described difficulty, and to that end I provide a gas purifying material which is treated before installation in the purification system, whereby it is caused to be in a sterilized condition as regards hydrogen sulphide generating organisms. To accomplish this purpose I prepare either an oxide or a sponge purifying material to which has been added a small amount of sterilization agent. These agents may be chosen for any or all of qualities such as fungicidal action and germicidal action, for example from the group in which the desired qualities are derived from the phenol value, such as phenol, tar acid, cresole, sodium phenolate, sodium cresolate, etc. Suitable sterilization agents may also be obtained from the group in which the desired qualities are derived by the liberation of halogens, such as sodium hypochlorite, calcium hypochlorite, etc.

I have found that commercial tar acid, when used in quantities as small as 0.25 pound per 10 bushels of sponge (that is approximately 0.1% by weight) effectively eliminates the activities of the $H_2S$ generating organisms. Other sterilization agents can be used in correspondingly small amounts. By way of example, commercial tar acid contains 30% to 35% of phenols. A substantially pure phenol commercial product known as 39° C. Minimum melting point phenol is three times as effective as tar acid, and is therefore effective when used in one-third the amount. The sterilization agent may be added to the mixture of oxide and wood shavings when the sponge is being prepared, or it may be added to the oxide before shipment to the point of sponge manufacture. The latter method offers a method of providing an oxide which will produce sponge free from hydrogen sulphide generating organisms for such plants as prefer to mix their own sponge.

The fact that certain living organisms can exist in an atmosphere of gas containing $H_2S$ has been known for some time. In my U. S. Patent No. 1,701,825, granted February 12, 1929, I describe a method of gas purification which depends upon the ability of certain bacteria, such as the *Thiobacillus thiopacus* and the *Thiobacillus denitrificans*, to oxidize hydrogen sulphide to sulphur or sulphuric acid or both, and water. The gas containing $H_2S$ is purified by contact with a medium containing bacteria capable of oxidizing $H_2S$ and containing means for supporting the life processes of said bacteria.

I prefer to practice the present invention in conjunction with my U. S. Patent No. 1,818,871, granted August 11, 1931. The invention is of course applicable to all gas purifying materials of the type referred to, and I do not restrict myself to the method of practicing the invention which I describe below.

In my U. S. Patent No. 1,818,871 I describe the production of a ferric oxide gas purifying material by heating a mixture of an iron oxide bearing material with an alkali bearing material to a temperature of 760° C. to 1200° C., forming the alkali ferrite. Preferably I heat a mixture of pyrites cinder and soda ash to a temperature of approximately 954° C. (1750° F.) forming sodium ferrite. The sodium ferrite is decomposed by hot water into chemically active ferric oxide and caustic soda solution, the soda solution being drained or filtered from the ferric oxide, and the ferric oxide being substantially freed of soda by subsequent washing with fresh water. The soda thus recovered is returned to the process by mixing it with fresh pyrites cinder. The chemically active iron oxide is preferably wet ground in suitable equipment so that about 90% passes a Bureau of Standards No. 325 screen, and I prefer to carry out this grinding operation in a cylindrical ball mill. The slurry leaving the ball mill may be dried at a temperature not exceeding 300° F. and sold as a gas purifying oxide, or it may be used, with additional water if necessary, for coating wood shavings to produce a sponge of given ferric oxide content.

In one method of practicing the present invention I add the sterilization agent in the required proportions to the oxide entering the ball mill and in this way provide a treated material which may either be dried for use as oxide or made into sponge. In another method, when the slurry is to be used for the production of sponge I may add the desired amount of sterilization agent to the slurry after it leaves the ball mill, but before it is mixed with the wood shavings. In a third method, when sponge is made in a batch mixer, the sterilization agent required for the batch can be added to the mixer with the oxide, shavings, and water.

The amount of sterilization agent used depends upon its effectiveness in eliminating the activities of hydrogen sulphide generating organisms. I have explained that .025 pound of tar acid per bushel of sponge is sufficient. If the sponge is to contain 10 pounds of oxide, dry basis, per bushel, I can add the tar acid in the proportion of .025 pound of tar acid per 10 pounds of dry oxide, either to the oxide entering the ball mill or to the slurry leaving the ball mill. The proportion is of course adjusted with the amount of oxide, dry basis, used per bushel of sponge. If the sponge is made in a batch mixer I can add the tar acid to each batch in quantity sufficient to provide 0.025 pound of tar acid per bushel of finished sponge.

In addition to the difficulties I have mentioned arising from the contamination of the gas by hydrogen sulphide generating organisms there is a further purely physical effect of the organisms on the purification system. The organisms, as they grow, fill in the pores or voids through which the gas normally passes and introduce a tight soggy layer. The result is an area resistant to the flow of gas, which forces the gas to take preferential paths through the purifying material. As a result of this preferential flow, portions of the purifying material will be only partially effective, and the service rendered by the box is reduced in proportion to the effectiveness of the gas purifying material.

Having thus described and exemplified my invention, to which examples the scope of the invention is by no means limited, I claim:

Gas-purifying sponge material for dry boxes comprising ferric oxide distributed over a porous cellulosic fluffing medium such as wood shavings and containing a germicide consisting of .025 pound of tar acid per bushel of sponge or 0.25% by weight of the dry oxide disseminated throughout the sponge.

GILBERT E. SEIL.